(12) United States Patent
Adams et al.

(10) Patent No.: US 6,736,021 B2
(45) Date of Patent: May 18, 2004

(54) RACK AND PINION STEERING GEAR WITH LOW FRICTION ROLLER YOKE DESIGN

(75) Inventors: Bobby Joe Adams, Rogersville, TN (US); Scott C. Little, Rogersville, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/839,913

(22) Filed: Apr. 20, 2001

(65) Prior Publication Data

US 2002/0152825 A1 Oct. 24, 2002

(51) Int. Cl.[7] .............................................. F16H 35/00
(52) U.S. Cl. ...................... 74/388 PS; 74/409
(58) Field of Search .................... 74/422, 409, 388 PS, 74/384; 384/53, 54

(56) References Cited

U.S. PATENT DOCUMENTS

| | | | | |
|---|---|---|---|---|
| 2,509,161 A | * | 5/1950 | Meyers | 74/422 |
| 3,908,479 A | * | 9/1975 | MacDuff | 74/498 |
| 4,215,591 A | * | 8/1980 | Bishop | 74/422 |
| 4,271,716 A | * | 6/1981 | Carduner | 74/422 |
| 5,117,705 A | * | 6/1992 | Guasch | 74/422 |
| 5,983,742 A | * | 11/1999 | Morris et al. | 74/422 |
| 6,408,708 B1 | | 6/2002 | Sahr | |

FOREIGN PATENT DOCUMENTS

| | | | | |
|---|---|---|---|---|
| JP | 05147542 | * | 6/1993 | B26D/5/04 |
| JP | 11034886 | * | 2/1999 | B62D/3/12 |

* cited by examiner

*Primary Examiner*—David Fenstermacher
(74) *Attorney, Agent, or Firm*—Tarolli, Sundheim, Covell & Tummino L.L.P.

(57) ABSTRACT

A rack and pinion steering gear (10) comprises a housing (12) having an axially extending passage (14) and a yoke bore (18) that intersects the axially extending passage (14) within the housing (12). A pinion gear (26) is rotatably mounted in the housing (12). A rack bar (34) extends through the axially extending passage (14) and is movable relative to the pinion gear (26). The rack bar (34) has teeth in meshing engagement with teeth (32) of the pinion gear (26). A yoke assembly (54) is located in the yoke bore (18) of the housing (12) for at least partially supporting and guiding movement of the rack bar (34) relative to the pinion gear (26). The yoke assembly (54) comprises a yoke (56) having first and second roller assemblies (154 and 166) for contacting the rack bar (34) and rotating during movement of the rack bar (34). A first spindle (112) supports the first roller assembly (154) and a second spindle (114) supports the second roller assembly (166).

14 Claims, 4 Drawing Sheets

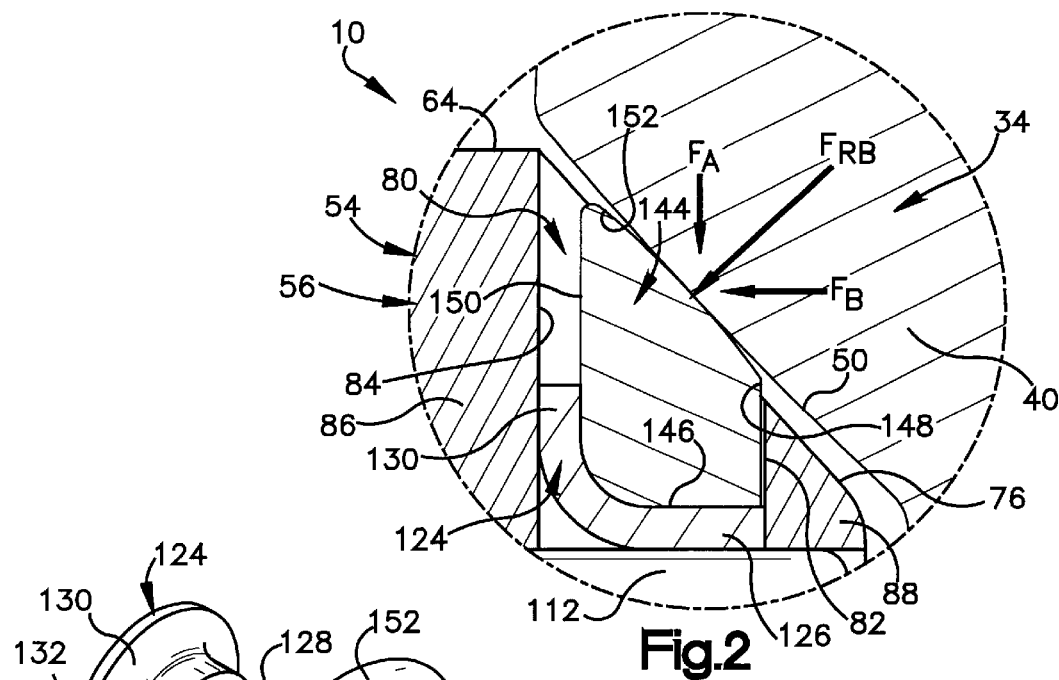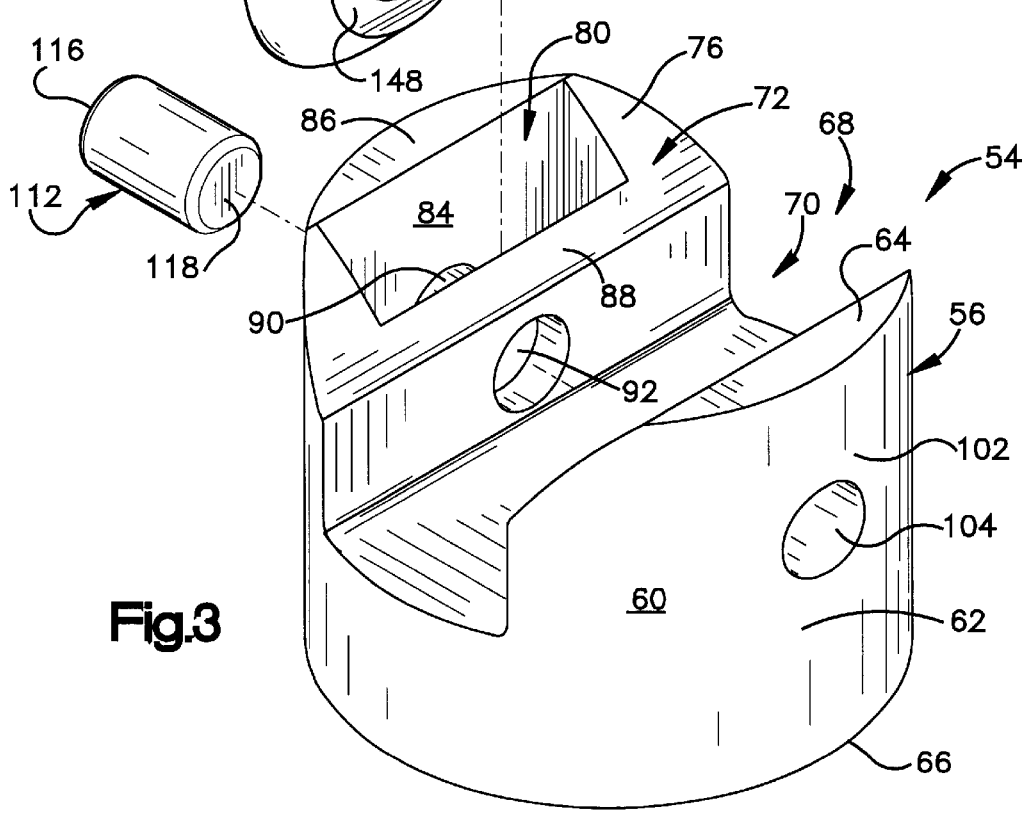

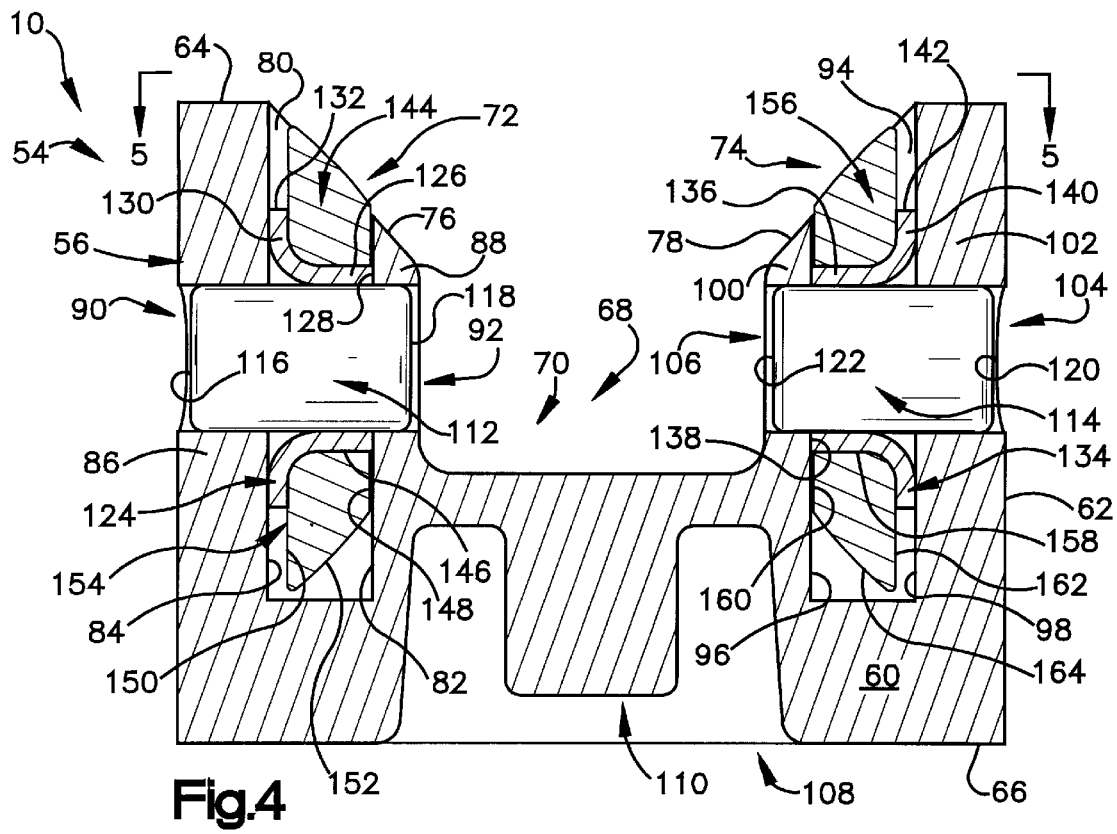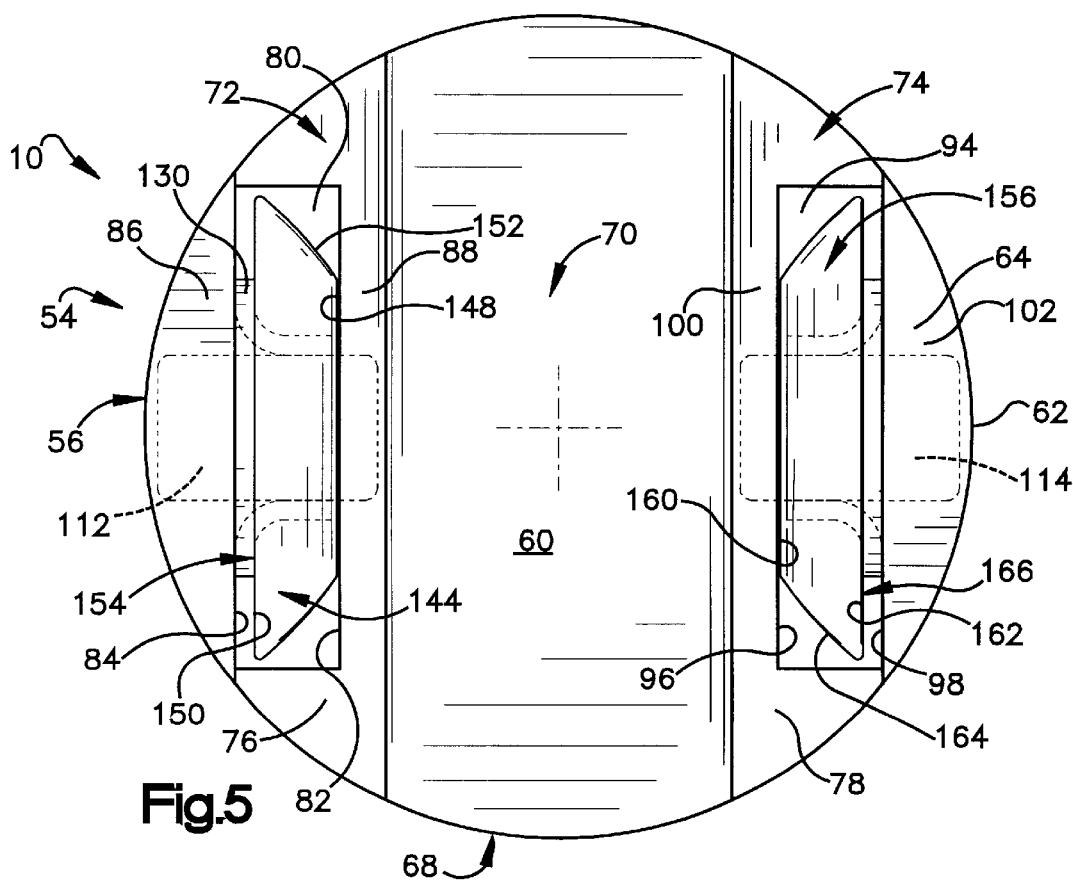

RACK AND PINION STEERING GEAR WITH LOW FRICTION ROLLER YOKE DESIGN

TECHNICAL FIELD

The present invention relates to a rack and pinion steering gear and, more particularly, to a rack and pinion steering gear having a low friction yoke assembly.

BACKGROUND OF THE INVENTION

A known rack and pinion steering gear includes a pinion gear that is rotatably mounted in a housing and is connected with a steering wheel of a vehicle. A rack bar extends axially through the housing and has opposite end portions connected with steerable vehicle wheels. Gear teeth formed on the rack bar are disposed in meshing engagement with gear teeth on the pinion gear. A yoke assembly, including a yoke and a spring, is disposed in the housing to support and guide movement of the rack bar relative to the housing.

The yoke 210 of the known rack and pinion steering gear is shown in FIG. 6. An axially extending cavity 212 extends through the yoke 210 and intersects an upper surface 214 of the yoke 210. The axially extending cavity 212 forms diametrically opposite first and second support walls 216 and 218. The first and second support walls 216 and 218 support a spindle 220 that extends across the axially extending cavity 212 of the yoke 210. The length of the spindle 220 is approximately equal to the diameter of the yoke 210. The spindle 220 supports first and second roller assemblies 222 and 224 within the axially extending cavity 212. The first roller assembly 222 is near the first support wall 216 and the second roller assembly 224 is near the second support wall 218. Each of the first and second roller assemblies 222 and 224 include a roller 226 that is fixed to a bushing 228. Each roller 226 has a concave bearing surface 230 for contacting and supporting the rack bar 232. The first and second roller assemblies 222 and 224 rotate relative to the yoke 210 and the spindle 220 during axial movement of the rack bar 232.

During operation of this known rack and pinion steering gear, the yoke assembly may be subjected to both heat and high loads. The heat is produced by friction, generally between the rack bar 232 and the bearing surfaces 230 of the rollers 226 as the rack bar 232 moves over the rollers 226. A high load may occur, for example, when a vehicle hits a pothole in the road surface. The impact load of the vehicle tire with the pothole is transferred to the rack bar 232 through the vehicle tie rods. The rack bar 232, in turn, transfers a portion of the load to the yoke assembly. The load transferred to the yoke assembly should be absorbed by the spring that biases the yoke 210 against the rack bar 232. However, in the yoke assembly of the known rack and pinion steering gear, the load of the rack bar 232 on the rollers 226 creates a significant bending moment on the spindle 220. As a result, the load may cause the spindle 220 to bend in a location between the roller assemblies 222 and 224. When the spindle 220 bends, rotation of the first and second roller assemblies 222 and 224 may be impaired and increased friction and heat may develop between the rack bar 232 and the yoke assembly.

SUMMARY OF THE INVENTION

The present invention is a rack and pinion steering gear. The rack and pinion steering gear comprises a housing having an axially extending passage and a yoke bore that extends perpendicular to the axially extending passage and connects with the axially extending passage within the housing. A pinion gear having teeth is rotatably mounted in the housing. A rack bar extends through the axially extending passage of the housing and is movable relative to the pinion gear. The rack bar has teeth in meshing engagement with the teeth of the pinion gear. A yoke assembly is located in the yoke bore of the housing for at least partially supporting and guiding axial movement of the rack bar relative to the pinion gear. The yoke assembly comprises a yoke having first and second roller assemblies for contacting the rack bar and rotating during axial movement of the rack bar. A first spindle is fixed to the yoke and supports the first roller assembly and a second spindle is fixed to the yoke and supports the second roller assembly.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is an enlarged view of a portion of the rack and pinion steering gear of FIG. 1;

FIG. 3 is an exploded view of a first roller assembly of a yoke of the yoke assembly shown in FIG. 1;

FIG. 4 is a cross-sectional view of the yoke assembly of FIG. 1;

FIG. 5 is a view taken along line 5—5 in FIG. 4; and

DETAILED DESCRIPTION OF THE INVENTION

Figure 1:
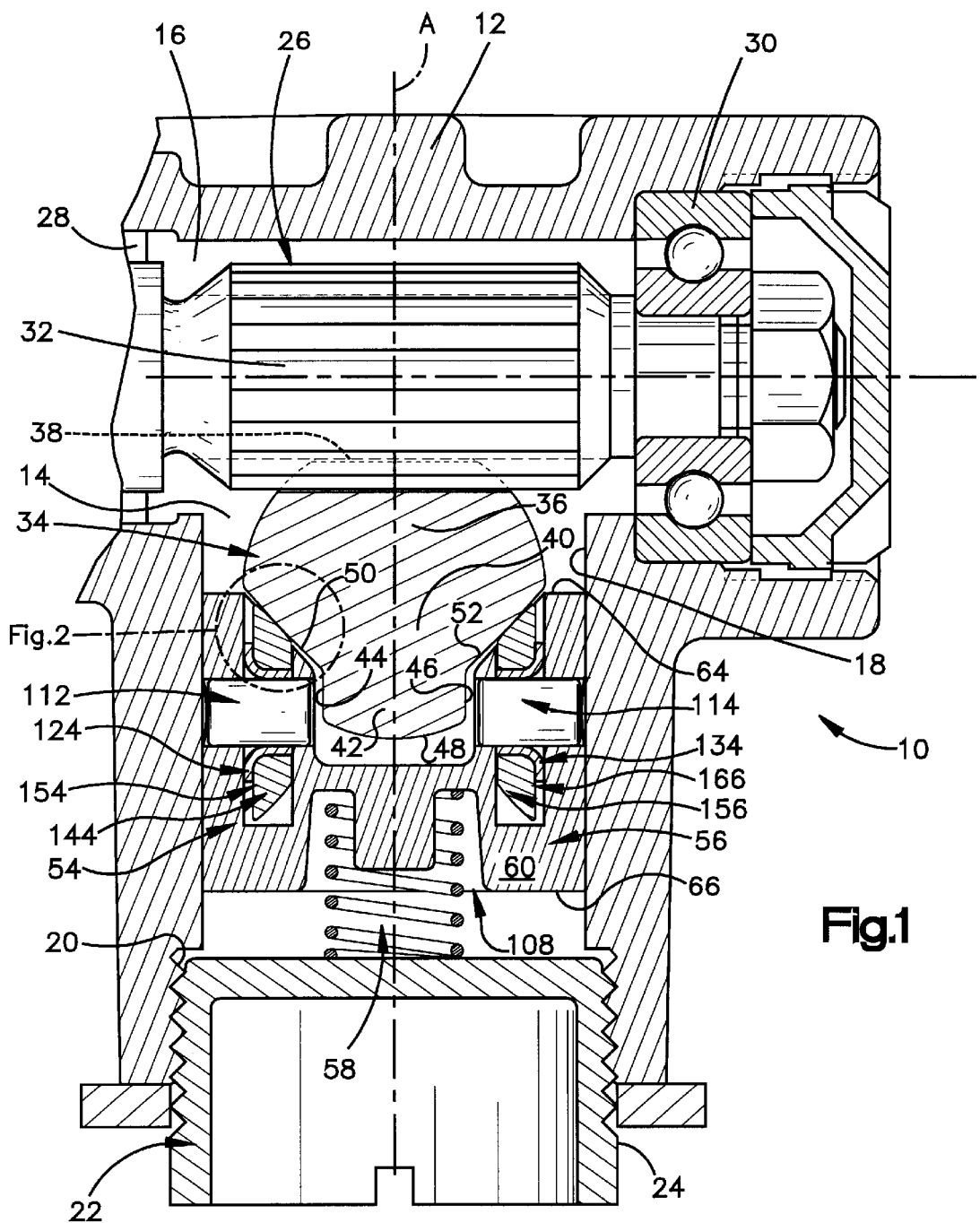
FIG. 1 is a cross-sectional view of a rack and pinion steering gear having a yoke assembly constructed in accordance with the present invention.
Figure 6:
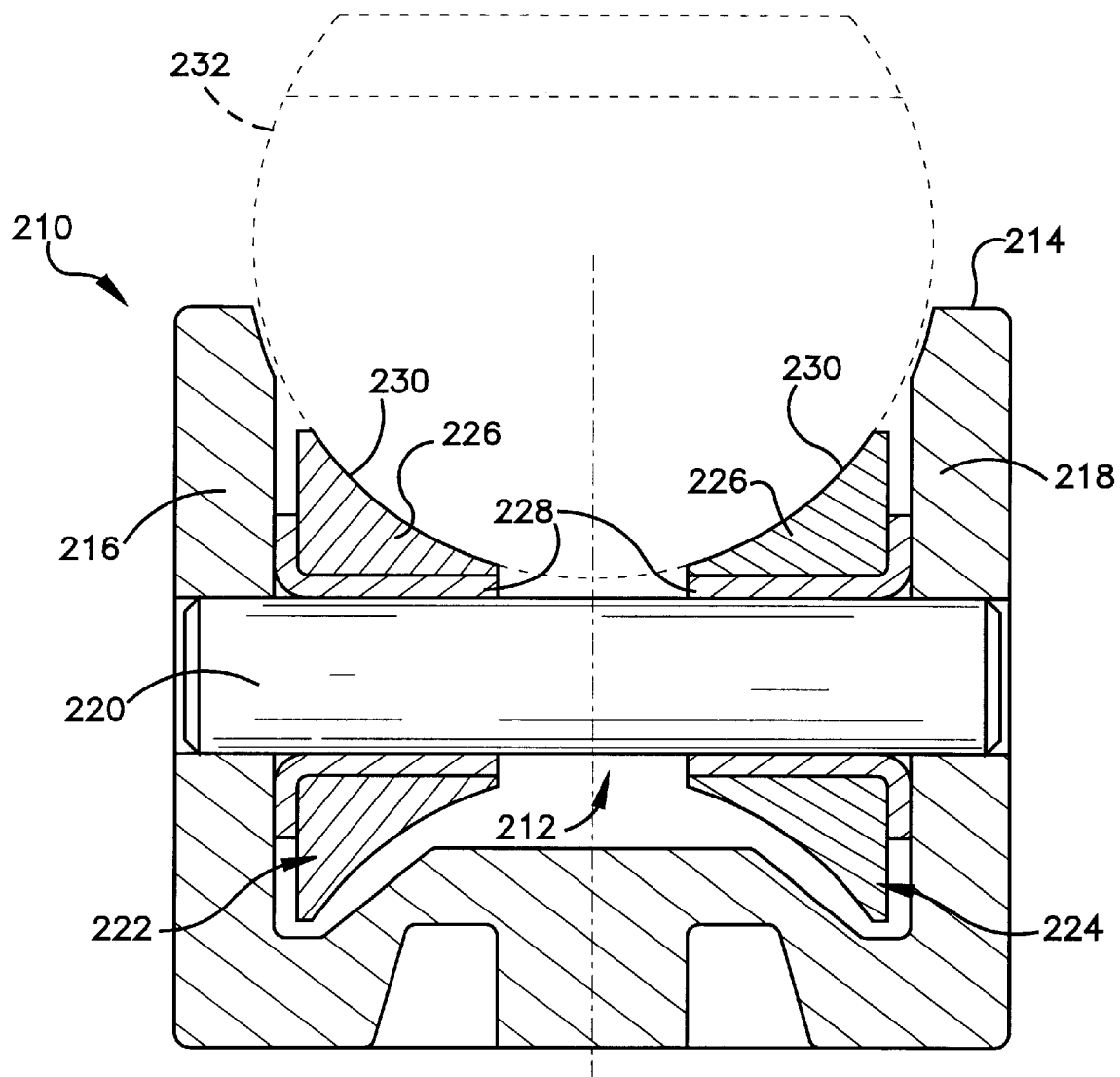
FIG. 6 illustrates a prior art yoke.

A cross-sectional view of a rack and pinion steering gear 10 constructed in accordance with the present invention is illustrated in FIG. 1. The rack and pinion steering gear 10 includes a housing 12. Preferably, the housing 12 is made of cast metal. The housing 12 includes an axially extending passage 14, extending perpendicular to the plane of FIG. 1. A pinion passage 16 extends into the housing 12 and tangentially intersects the axially extending passage 14. A yoke bore 18 also extends into the housing 12 and connects with the axially extending passage 14. The yoke bore 18 extends in a direction perpendicular to the axially extending passage 14. In FIG. 1, axis A represents a central axis of the yoke bore 18. Axis A extends in a direction perpendicular to the axis of the axially extending passage 14. As shown in FIG. 1, the yoke bore 18 is located on a side of the axially extending passage 14 opposite the pinion passage 16. The yoke bore 18 terminates at a threaded opening 20. A cylindrical plug 22 having a threaded outer surface 24 screws into the threaded opening 20 of the yoke bore 18 to close the end of the yoke bore 18.

A pinion gear 26 is located in the pinion passage 16 of the housing 12. Two bearing assemblies 28 and 30 rotatably support the pinion gear 26 in the housing 12. The first bearing assembly 28 is located at one end of the pinion gear 26. A second bearing 30 assembly is located at an opposite end of the pinion gear 26. A plurality of teeth 32 extends around the outer circumference of the pinion gear 26. The pinion gear 26 is connected with the vehicle steering wheel (not shown) in a known manner.

A portion of an axially extending rack bar 34 extends through the axially extending passage 14 of the housing 12.

The rack bar 34 has opposite end portions (not shown) that are connected to steerable wheels (not shown) of a vehicle through tie rods (not shown). The rack bar 34 illustrated is commonly referred to a mini-Y rack bar. Although the mini-Y rack bar is preferred, those skilled in the art will recognize that any known type of rack bar may be used with the invention.

When viewed in cross-section, the rack bar 34 has a generally semi-circular upper portion 36. A flattened upper surface 38 of the upper portion 36 of the rack bar 34 includes a plurality of teeth (not shown). Teeth of the rack bar 34 are disposed in meshing engagement with teeth 32 of the pinion gear 26.

A lower portion 40 of the rack bar 34 includes an axially extending lobe 42. A cross-section of the lobe 42 includes parallel first and second side surfaces 44 and 46, respectively, and an arcuate bottom surface 48. The arcuate bottom surface 48 is located opposite the teeth of the upper portion 36 of the rack bar 34. The first and second side surfaces 44 and 46 extend in a direction parallel to axis A and connect the arcuate bottom surface 48 of the lobe 42 to first and second contact surfaces 50 and 52, respectively. The lobe 42 has a width, defined as the distance between the first and second side surfaces 44 and 46, of approximately forty-five percent of the diameter of the semi-circular upper portion 36. The lobe 42 has a depth, defined as the distance along axis A between the first contact surface 50 and the arcuate bottom surface 48 of the lobe 42, of approximately one-half the width of the lobe 42. The first and second contact surfaces 50 and 52 of the lower portion 40 of the rack bar 34 are flat. The first contact surface 50 connects the first side surface 44 of the lobe 42 to the upper portion 36 of the rack bar 34. The second contact surface 52 connects the second side surface 46 of the lobe 42 to the upper portion 36 of the rack bar 34. Both the first and second contact surfaces 50 and 52 extend at an angle of approximately forty-five degrees to axis A.

A low friction yoke assembly 54 is located within the yoke bore 18 of the housing 12. The yoke assembly 54 at least partially supports and guides movement of the rack bar 34 relative to the housing 12.

The yoke assembly 54 comprises a yoke 56 and a spring 58. The yoke 56 is preferably made from steel. The yoke 56 has a cylindrical main body portion 60. The main body portion 60 includes a cylindrical side wall 62 (FIGS. 3 and 4) and opposite first and second end surfaces 64 and 66, respectively. A length of the yoke 56 is defined as the distance along axis A between the first end surface 64 and the second end surface 66.

The first end surface 64 is nearest the rack bar 34 in the assembled rack and pinion steering gear 10, as shown in FIG. 1. A central channel 68 (FIGS. 3, 4, and 5) extends axially, parallel to the rack bar 34, through the main body portion 60 of the yoke 56 and intersects the first end surface 64. The central channel 68 includes a central portion 70 and first and second outer portions 72 and 74 (FIG. 4), respectively. The central portion 70 of the central channel 68 has a width, perpendicular to axis A, that is approximately forty percent of a diameter of the main body portion 60 of the yoke 56 and a depth, along axis A, that is approximately sixty percent of the length of the yoke 56. The first and second outer portions 72 and 74 of the central channel 68 extend from the first end surface 64 toward the central portion 70 of the central channel 68 at an angle of approximately forty-five degrees, as shown in FIG. 4. The first outer portion 72 of the central channel 68 defines a first cantered surface 76 (FIG. 5) of the yoke 56 and the second outer portion 74 of the central channel 68 defines a second cantered surface 78 (FIG. 5) of the yoke 56.

A first blind pocket 80 extends into the first cantered surface 76 of the yoke 56. As shown in FIG. 4, the first blind pocket 80 has a depth of approximately seventy-five percent of the length of the yoke 56. As shown in FIG. 5, the first blind pocket 80 has a length in an axial direction of approximately fifty percent of the diameter of the main body portion 60 of the yoke 56. A width of the first blind pocket 80 is defined as the distance between an inner side wall 82 and an outer side wall 84 of the first blind pocket 80. The first blind pocket 80 has a width of approximately twenty-five percent of its length. Both the inner side wall 82 and the outer side wall 84 of the first blind pocket 80 are coated with a wear resistant and low friction coating.

The first blind pocket 80 forms a first support wall 86 and a second support wall 88 in the main body portion 60 of the yoke 56. The first support wall 86 is defined between the cylindrical side wall 62 of the main body portion 60 of the yoke 56 and the outer side wall 84 of the first blind pocket 80. A hole 90 (FIGS. 3 and 4) extends through the first support wall 86 and intersects the first blind pocket 80 in a central location.

The second support wall 88 is defined between the inner side wall 82 of the first blind pocket 80 and the central portion 70 of the central channel 68. A hole 92 (FIGS. 3 and 4) extends through the second support wall 88 and intersects the first blind pocket 80. The hole 92 in the second support wall 88 is coaxial with the hole 90 in the first support wall 86.

A second blind pocket 94 (FIGS. 4 and 5) extends into the second cantered surface 78 of the yoke 56. The second blind pocket 94 has dimensions that are equal to the dimensions of the first blind pocket 80. As shown in FIGS. 4 and 5, the second blind pocket 94 has an inner side wall 96 and an outer side wall 98. Both the inner side wall 96 and the outer side wall 98 of the second blind pocket 94 are coated with a wear resistant and low friction coating.

The second blind pocket 94 forms a third support wall 100 and a fourth support wall 102. The third support 100 wall is defined between the cylindrical side wall 62 of the main body portion 60 of the yoke 56 and the outer side wall 98 of the second blind pocket 94. A hole 104 (FIGS. 3 and 4) extends through the third support wall 100 and intersects the second blind pocket 94 in a central location.

The fourth support wall 102 is defined between the inner side wall 96 of the second blind pocket 94 and the central portion 70 of the central channel 68. A hole 106 extends through the fourth support wall 102 and intersects the second blind pocket 94. The hole 106 (FIG. 4) in the fourth support wall 102 is coaxial with the hole 104 in the third support wall 100.

As shown in FIG. 4, the second end surface 66 of the yoke 56 includes a centrally located, annular bore 108. The bore 108 has an outer diameter of approximately forty percent of the diameter of the main body portion 60 of the yoke 56 and an inner diameter of approximately twenty percent the diameter of the main body portion 60 of the yoke 56. The bore 108 defines a cylindrical protrusion 110 that extends along axis A toward the second end surface 66 of the yoke 56.

The yoke 56 further includes first and second spindles 112 and 114 (FIG. 4), respectively. The first and second spindles 112 and 114 are cylindrical and are preferably made from steel. Each of the first and second spindles 112 and 114 has a length between a first end and a second end of approximately twenty-five percent of the diameter of the main body portion 60 of the yoke 56. A first end 116 (FIG. 4) of the first spindle 112 is inserted into the hole 90 in the first support wall 86 and a second end 118 (FIG. 4) of the first spindle 112 is inserted into the hole 92 in the second support wall 88. Thus, the first spindle 112 spans the first blind pocket 80.

A first end 120 (FIG. 4) of the second spindle 114 is inserted into the hole 104 in the third support wall 100 and a second end 122 (FIG. 4) of the second spindle 114 is inserted into the hole 106 in the fourth support wall 102. Thus, the second spindle 114 spans the second blind pocket 94. Both the first and second spindles 112 and 114 are fixed relative to the yoke 56.

The first spindle 112 rotatably supports a first bushing 124 (FIGS. 2, 3, and 4). The first bushing 124 is annular and has an inner diameter that is defined by a first portion 126 (FIGS. 2 and 3) of the first bushing 124. The first portion 126 of the first bushing 124 extends parallel to the first spindle 112. The first portion 126 terminates in a first terminal end 128 (FIG. 3). The first bushing 124 also includes a second portion 130 that curves outwardly of the first portion 126 to define an outer diameter of the first bushing 124. The second portion 130 of the first bushing 124 terminates at a second terminal end 132 (FIG. 3).

The second spindle 114 rotatably supports a second bushing 134 (FIG. 4). The second bushing 134 is annular and has an inner diameter that is defined by a first portion 136 of the second bushing 134. The first portion 136 of the second bushing 134 extends parallel to the second spindle 114. The first portion 136 terminates in a first terminal end 138. The second bushing 134 also includes a second portion 140 that curves outwardly of the first portion 136 to define an outer diameter of the second bushing 134. The second portion 140 of the second bushing 134 terminates at a second terminal end 142.

A first roller 144 (FIGS. 3 and 4) is fixedly attached to the first bushing 124. The first roller 144 is annular and includes a central surface 146, an inner surface 148, outer surface 150 (FIGS. 4 and 5), and a bearing surface 152. The central surface 146 defines an inner diameter of the first roller 144. The central surface 146 receives and is fixed to the first portion 126 of the first bushing 124. The inner surface 148 is located nearest the central channel 68 of the yoke 56 and the outer surface 150 is opposite the inner surface 148. The second portion 130 of the first bushing 124 contacts a portion of the outer surface 150 of the first roller 144. The bearing surface 152 of the first roller 144 extends between the inner surface 148 and the outer surface 150. The bearing surface 152 is slightly convex so that when contacting a flat surface, point contact is made. The bearing surface 152 forms the outer diameter of the first roller 144 and is angled at approximately forty-five degrees to axis A. The outer diameter of the first roller 144 is approximately ninety percent the length of the first blind pocket 80. The first roller 144 and the first bushing 124 collectively form the first roller assembly 154.

A second roller 156 (FIG. 4) is fixedly attached to the second bushing 134. The second roller 156 is annular and includes a central surface 158, an inner surface 160, outer surface 162, and a bearing surface 164. The central surface 158 defines an inner diameter of the second roller 156. The central surface 158 receives and is fixed to the first portion 136 of the second bushing 134. The inner surface 160 is located nearest the central channel 68 of the yoke 56 and the outer surface 162 is opposite the inner surface 160. The second portion 140 of the second bushing 134 contacts a portion of the outer surface 162 of the second roller 156. The bearing surface 164 of the second roller 156 extends between the inner surface 160 and the outer surface 162. The bearing surface 164 is slightly convex so that when contacting a flat surface, point contact is made. The bearing surface 164 forms the outer diameter of the second roller 156 and is angled at approximately forty-five degrees to axis A. The outer diameter of the second roller 156 is approximately ninety percent the length of the second blind pocket 94. The second roller 156 and the second bushing 134 collectively form the second roller assembly 166.

The yoke assembly 54 further includes a spring 58 (FIG. 1). The spring 58 is preferably a helical spring with a diameter sized to fit into the annular bore 108 extending into the second end surface 66 of the yoke 56. In the assembled rack and pinion steering gear 10, the cylindrical protrusion 110 preferably extends through the center of a portion of the spring 58 for controlling the location of the spring 58 relative to the yoke 56. The spring 58 is disposed between the yoke 56 and the plug 22. The spring 58 biases the yoke 56 against the rack bar 34. As loads on the rack bar 34 vary, the spring 58 will compress or expand so that the yoke 56 may move relative to the plug 22.

In the assembled rack and pinion steering gear 10, the bearing surface 152 of the first roller 144 contacts the first contact surface 50 on the lower portion 40 of the rack bar 34 and the bearing surface 164 of the second roller 156 contacts the second contact surface 52 on the lower portion 40 of the rack bar 34. Since the bearing surfaces 152 and 164 of both the first and second rollers 144 and 156 are slightly convex, only point contact is made between each bearing surface 152 and 164 and the respective contact surface 50 and 52 of the rack bar 34. Point contact reduces friction and friction related heat between the rack bar 34 the rollers 144 and 156.

When the first and second rollers 144 and 156 contact the first and second contact surfaces 50 and 52, respectively, the lobe 42 of the lower portion 40 of the rack bar 34 is received in the central portion 70 of the central cavity 68. As a result, any tendency of the rack bar 34 to rotate will be resisted by the surfaces defining the central portion 70 of the central cavity 68.

FIG. 2 shows an enlarged view of the interaction between the first contact surface 50 of the rack bar 34 and the bearing surface 152 of the first roller 144. Although not discussed, the interaction between the second contact surface 52 of the rack bar 34 and the bearing surface 164 of the second roller 156 will be a mirror image of that described with reference to FIG. 2.

The rack bar 34 imparts a load on the first roller 144. The load, represented by $F_{RB}$ in FIG. 2, is normal to the first contact surface 50 of the lower portion 40 of the rack bar 34. Thus, the load $F_{RB}$ imparted on the first roller 144 may be divided into a force vector $F_A$ that is parallel to axis A and a force vector $F_B$ that is perpendicular to axis A and directed radially outwardly from axis A toward the first support wall 86 of the yoke 56.

The force vector $F_A$ is transferred through the first roller 144, the first bushing 124, and the first spindle 112 to the main body portion 60 of the yoke 56. Since the first and second support walls 86 and 88 for the first spindle 112 are located immediately adjacent the first bushing 124 and the first spindle 112 is short relative to the diameter of the main body portion 60 of the yoke 56, the bending moment applied to the first spindle 112 as a result of force vector $F_A$ is small and will not cause bending of the first spindle 112. Thus, force vector $F_A$ is completely transferred to the main body portion 60 of the yoke 56. As a result, the yoke 56 causes the spring 58 to compress and the yoke 56 moves toward the plug 22 an amount necessary for the spring 58 to absorb force vector $F_A$.

The force vector $F_B$ is transferred through the first roller 144 to the second portion 130 of the first bushing 124. Force vector $F_B$ forces the first bushing 124 toward the outer side wall 84 of the first blind pocket 80. By contacting the outer side wall 84 of the first blind pocket 80, the first bushing 124 acts as a thrust bearing to resist the force vector $F_B$. As the first bushing 124 rotates relative to the yoke 56 during axial movement of the rack bar 34, the second portion 130 of the first bushing 124 rubs against the outer side wall 84 of the first blind pocket 80 to resist the force vector $F_B$. Since the outer side wall 84 of the first blind pocket 80 is coated with a wear resistant, low friction coating, minimal friction and friction related heat is created as a result of the contact between the second portion 130 of the first bushing 124 and the outer side wall 84 of the first blind pocket 80.

From the above description of the invention, those skilled in the art will perceive improvements, changes and modifications. Such improvements, changes and modifications within the skill of the art are intended to be covered by the appended claims.

Having described the invention, we claim the following:

1. A rack and pinion steering gear comprising:
    a housing having an axially extending passage and a yoke bore that extends perpendicular to the axially extending passage and connects with the axially extending passage within the housing, the yoke bore having a yoke bore axis;
    a pinion gear rotatably mounted in the housing, the pinion gear having teeth;
    a rack bar extending through the axially extending passage of the housing and being movable relative to the pinion gear, the rack bar having teeth in meshing engagement with the teeth of the pinion gear; and
    a yoke assembly located in the yoke bore of the housing for at least partially supporting and guiding axial movement of the rack bar relative to the pinion gear,
    the yoke assembly comprising a yoke having first and second roller assemblies for contacting the rack bar and rotating during axial movement of the rack bar, a first spindle being fixed against movement relative to the yoke and supporting the first roller assembly, and a second spindle being fixed against movement relative to the yoke and supporting the second roller assembly,
    the first roller assembly including a first bushing and a first roller, the first roller being supported by the first bushing and the first bushing being supported by the first spindle about a roller axis, the first bushing transferring a first radial load relative to the roller axis from the first roller to the first spindle,
    the second roller assembly including a second bushing and a second roller, the second roller being supported by the second bushing and the second bushing being supported by the second spindle about the roller axis, the second bushing transferring a second radial load relative to the roller axis from the second roller to the second spindle,
    the first and second spindles and the first and second bushings, as well as, the first and second rollers being coaxial with one another,
    the first spindle, first bushing, and the first roller being axially spaced apart from the second spindle, the second bushing, and the second roller.

2. The rack and pinion steering gear of claim 1 further being defined by:
    opposite ends of the first spindle being supported by the yoke, the first roller assembly being supported between the opposite ends of the first spindle; and
    opposite ends of the second spindle being supported by the yoke, the second roller assembly being supported between the opposite ends of the second spindle.

3. The rack and pinion steering gear of claim 2 further being defined by:
    both the first and second rollers having a bearing surface for contacting the rack bar, the bearing surface of each roller being convex such that point contact is made with the rack bar.

4. The rack and pinion steering gear of claim 3 further being defined by:
    both the first and second bushings including a first portion for contacting a respective spindle and a second portion for contacting a portion of an outer surface of a respective roller.

5. The rack and pinion steering gear of claim 4 further being defined by:
    the yoke including first and second blind pockets, the first and second blind pockets having an axial width that is greater than an axial width of a respective roller assembly,
    the first blind pocket receiving the first roller assembly and the second blind pocket receiving the second roller assembly.

6. The rack and pinion steering gear of claim 5 further being defined by:
    each blind pocket including an inner and an outer side wall,
    a portion of each bushing contacting the outer side wall of the respective blind pocket.

7. The rack and pinion steering gear of claim 6 further being defined by:
    the yoke further including a central channel that is centered between the first and second blind pockets,
    the central channel extending axially through the yoke and receiving a portion of the rack bar for preventing rotation of the rack bar relative to the yoke.

8. The rack and pinion steering gear of claim 6 further being defined by:
    the inner and outer side walls of each blind pocket being coated with a wear resistant, low friction coating.

9. The rack and pinion steering gear of claim 1 wherein the first and second spindles extend perpendicular to the yoke bore axis and support the first and second roller assemblies, respectively, for rotation in parallel planes.

10. A rack and pinion steering gear comprising:
    a housing having an axially extending passage and a yoke bore that extends perpendicular to the axially extending passage and connects with the axially extending passage within the housing;
    a pinion gear rotatably mounted in the housing, the pinion gear having teeth;
    a rack bar extending through the axially extending passage of the housing and being movable relative to the pinion gear, the rack bar having teeth in meshing engagement with the teeth of the pinion gear; and
    a yoke assembly located in the yoke bore of the housing for at least partially supporting and guiding axial movement of the rack bar relative to the pinion gear, the yoke assembly comprising a yoke having first and second roller assemblies for contacting the rack bar and rotating during axial movement of the rack bar, a first spindle being fixed against rotation relative to the yoke and forming a first axis about which the first roller assembly rotates, a second spindle being spaced apart from the first spindle, the second spindle being fixed against rotation relative to the yoke and forming a second axis about which the second roller assembly rotates, the first and second axes being fixed relative to the yoke so that the first and second roller assemblies extend outwardly of the yoke and into contact with the rack bar, the first and second roller assemblies spacing the rack bar apart from the yoke of the yoke assembly.

11. A rack and pinion steering gear comprising:

a housing having an axially extending passage and a yoke bore that extends perpendicular to the axially extending passage and connects with the axially extending passage within the housing;

a pinion gear rotatably mounted in the housing, the pinion gear having teeth;

a rack bar extending through the axially extending passage of the housing and being movable relative to the pinion gear, the rack bar having teeth in meshing engagement with the teeth of the pinion gear; and a yoke assembly located in the yoke bore of the housing for at least partially supporting and guiding axial movement of the rack bar relative to the pinion gear, the yoke assembly comprising a yoke having first and second rollers for contacting the rack bar and rotating during axial movement of the rack bar, a first spindle forming a first axis about which the first roller rotates, a second spindle forming a second axis about which the second roller rotates, the first and second spindles being coaxial with one another and being axially spaced apart, the first and second spindles being fixed against rotation relative to the yoke, a force supplied by the rack bar to the first spindle being transmitted to the yoke through the first spindle and not through the second spindle, a force supplied by the rack bar to the second spindle being transmitted to the yoke through the second spindle and not through the first spindle.

12. The rack and pinion steering gear of claim 11 further being defined by:

opposite ends of the first spindle being supported by the yoke, the first roller assembly being supported between the opposite ends of the first spindle; and opposite ends of the second spindle being supported by the yoke, the second roller assembly being supported between the opposite ends of the second spindle.

13. The rack and pinion steering gear of claim 12 further being defined by:

the yoke including first and second blind pockets, the first and second blind pockets having axial widths that are greater than axial widths of the first and second roller assemblies, respectively, the first blind pocket receiving the first roller assembly and the second blind pocket receiving the second roller assembly.

14. A rack and pinion steering gear comprising:

a housing having an axially extending passage and a yoke bore that extends perpendicular to the axially extending passage and connects with the axially extending passage within the housing;

a pinion gear rotatably mounted in the housing, the pinion gear having teeth;

a rack bar extending through the axially extending passage of the housing and being movable relative to the pinion gear, the rack bar having teeth in meshing engagement with the teeth of the pinion gear; and a yoke assembly located in the yoke bore of the housing for at least partially supporting and guiding axial movement of the rack bar relative to the pinion gear, the yoke assembly comprising a yoke having first and second roller assemblies for contacting the rack bar and rotating during axial movement of the rack bar, a first spindle spanning a first gap located between first and second portions of the yoke, the first roller assembly being located in the first gap, the first spindle forming a first axis that is fixed relative to the yoke and about which the first roller assembly rotates, the first spindle transferring forces from the first roller assembly to the first and second portions of the yoke, a second spindle being spaced apart from the first spindle and spanning a second, different gap located between third and forth portions of the yoke, the second roller assembly being located in the second gap, the second spindle forming a second axis that is fixed relative to the yoke and about which the second roller assembly rotates, the second spindle transferring forces from the second roller assembly to the third and fourth portions of the yoke.

* * * * *